UNITED STATES PATENT OFFICE.

HEINRICH KRIEGSHEIM, OF NEW YORK, N. Y., ASSIGNOR TO THE PERMUTIT COMPANY, OF NEW YORK, N. Y., A CORPORATION OF DELAWARE.

PURIFYING BOILER-WATER.

1,243,191.   Specification of Letters Patent.   Patented Oct. 16, 1917.

No Drawing.   Application filed August 18, 1917. Serial No. 186,894.

*To all whom it may concern:*

Be it known that I, HEINRICH KRIEGSHEIM, a citizen of Germany, residing at New York, in the county of New York and State of New York, have invented certain new and useful Improvements in Purifying Boiler-Water, of which the following is a specification.

This invention relates to purifying boiler water; and it comprises a method of freeing the condensed water of steam plants from suspended oil wherein such water receives an addition of water from another source, such water from the other source having been previously passed through a bed of exchange silicates, and the mixture is thereafter treated to produce an oil-collecting coagulum therein, such treatment being either by electrolysis between electrodes of iron or other suitable metal, or by direct addition of suitable salts thereto; all as more fully hereinafter set forth and as claimed.

In modern steam plants of any size the condensed water from the engines is returned to the boiler for service anew. This water is very soft and free from impurities; but it always contains oil in suspension; this oil coming from the lubricants employed in the engines. The oil exists as very fine droplets intimately distributed through the water; the fineness of the suspension approaching those which are known as colloidal suspensions. It is quite difficult to remove this oil and many ways have been proposed for this purpose. Its removal is practically necessary since the presence of any lubricating oil in the boiler is dangerous, being apt to cause the superheating of boiler plates and tubes. The fineness of the suspension renders removal of the oil a serious technical problem. It is practically impossible to effect removal by a simple filtration, though various adsorbing materials such as charcoal may be employed. When so used cleansing of the filter for reuse is quite difficult. The most successful of the proposed ways are those which produce a coagulum of some sort in the water; this coagulum collecting and carrying down the oil. One way of producing the coagulum is to electrolyze the water between electrodes of iron or other metal. Generally the metal is iron; but aluminum has sometimes been used. On electrolysis oxid of iron (or oxid of aluminum) is produced in hydrated form and this collects and carries down the oil. But as electrolysis can only be carried on in a conductive solution and as pure water is almost a non-conductor, this process necessitates the addition of salts of one kind or another to the very pure condensation water. This is obviously undesirable. Instead of producing a coagulant by electrolysis as just described, a coagulum producing salt may be directly added, such as a salt of iron or alumina. Sulfate of iron or sulfate of alumina is generally employed. But in adding these sulfates it is in general necessary to dispose of the sulfuric acid by adding a base; generally soda or carbonate of soda. Lime or carbonate of lime is not practicable as a neutralizing agent because it will form scale producing salts. These iron or aluminum salts produce a coagulum by a well understood reaction.

In a well known way of purifying water from scale forming ingredients (lime and magnesia salts) the water is filtered through a bed of what are known as exchange silicates. These exchange silicates are complex bodies containing hydrated compounds of alumina and silica together with some alkali; this alkali being generally soda. On use with hard water the lime and magnesia in solution in the water are taken up by the exchange silicate, a corresponding amount of a sodium compound going into solution. When the activity of the exchange silicates is exhausted they may be revived by treatment with a solution of common salt (NaCl) when the reverse action occurs, the calcium and magnesium going into solution as chlorids while the exchange silicates take up sodium and become ready for reuse. The sodium salts going into solution on treating hard water usually include, or consist mainly of, sodium carbonate. Hard water generally contains carbonates of lime or of lime and magnesia; these carbonates being kept in solution to a greater or less extent by the presence of $CO_2$ (as bicarbonates). Some hard waters also contain sulfates of these bases. Occasionally chlorids are present. In the purification of any of these waters by exchange silicates the corresponding sodium salts go into solution while the calcium and magnesium are retained by the silicates.

I have found that the amount of these sodium salts in water so treated is sufficient to give conductivity enough to permit electrolysis between iron poles to produce a coagulant; and that the treated water will stand extensive dilution with pure water without losing this property. Such a mixture will also give a coagulum with iron salts or aluminum salts. As stated, the filtered water generally contains carbonate of sodium; which is not only a good material for imparting conductively but also has the power of directly reacting with these salts to give an oil-collecting coagulum.

In the present invention I utilize this discovery. The amount of water furnished in condensation in a steam plant is never sufficient to supply the boilers since there is always a loss of steam or water somewhere. Additional water must always be added to the condensation water in supplying the boiler. This make-up water, as it is called, ranges from 2 to 10 per cent. of the amount of water fed into the boiler. Now if the make-up water so supplied be that which has been taken through a bed of exchange silicates to free it of hardness, there will be enough sodium salts in it to make the mixture of condensation water and treated water sufficiently conductive for electrolysis; and there will also be enough carbonate of soda present to allow the addition of sufficient sulfate of alumina or sulfate of iron to produce a coagulum capable of collecting suspended oil.

In the present invention therefore I filter hard water through a bed of exchange silicates and mix the effluent with condensed water before removing the oil from the latter; the amount of effluent water so admixed being that necessary to furnish the "make-up" water. The mixture of condensed water and make-up water I may then electrolyze between iron poles. Aluminum poles may be employed but iron poles are sufficient. Because of the presence of the sodium salts coming from the exchange silicates the mixture of waters is conductive enough to permit electrolysis. Electrolysis may be by an alternating current or by a continuous current. Under the influence of the current the iron of the poles (or the aluminum as the case may be) is oxidized to form a hydrated oxid of gelatinous character which mixes with the liquid and attracts and collects the suspended oil droplets. The coagulum carrying the oil may be collected by filtration or the water allowed to settle and decanted. The treated water may be sent through a filter press or any other suitable filter. Common sand filters may be employed.

Instead of electrolyzing the mixture of condensed water and make-up water, a small amount of a solution of sulfate of alumina or of sulfate of iron may be added. In so doing the sulfuric acid of the sulfate combines with the sodium of the sodium carbonate present to form sodium sulfate which is a harmless body for the present purposes. And hydrated alumina or hydrated oxid of iron, as the case may be, is precipitated as a light gelatinous hydrate which collects the suspended matter as before. After the treatment the coagulum, carrying the oil, is separated as before.

The coagulum may be collected and the oil recovered in any suitable way, as by extraction.

What I claim is:—

1. The process of providing oil free water for boilers which comprises passing hard water through a bed of exchange silicates, mixing the softened effluent water with oily condensation water and producing gelatinous hydrated oxides in the mixture to collect the oil.

2. The process of providing oil free water for boilers which comprises passing hard water through a bed of exchange silicates, mixing the softened effluent water with oily condensation water and producing gelatinous hydrated oxid in the mixture by addition of a salt of such oxid to the mixture, such oxid serving to collect the oil of the condensation water.

3. The process of providing oil free water for boilers which comprises passing hard water through a bed of exchange silicates, mixing the softened effluent water with oily condensation water and producing gelatinous hydrated aluminum oxids in the mixture by addition of sulfate of alumina, such oxids serving to collect the oil of the condensation water.

4. A process of providing oil free water for boilers, which comprises passing hard water through a bed of exchange silicates to replace the hardness giving bases of such water by the corresponding sodium compounds, mixing the effluent soft water with oily condensation water and adding a salt to the mixture of waters, such salt being one decomposing with the sodium carbonate contained in the softened water to produce gelatinous hydrated insoluble oxids in said mixture of waters to collect the oil of the condensation water so used.

In testimony whereof, I affix my signature.

HEINRICH KRIEGSHEIM.